May 24, 1949.                D. B. VINCENT                2,471,363
                      PROCESS OF MAKING FOOD PRODUCTS
Filed Nov. 27, 1945                                 2 Sheets-Sheet 1
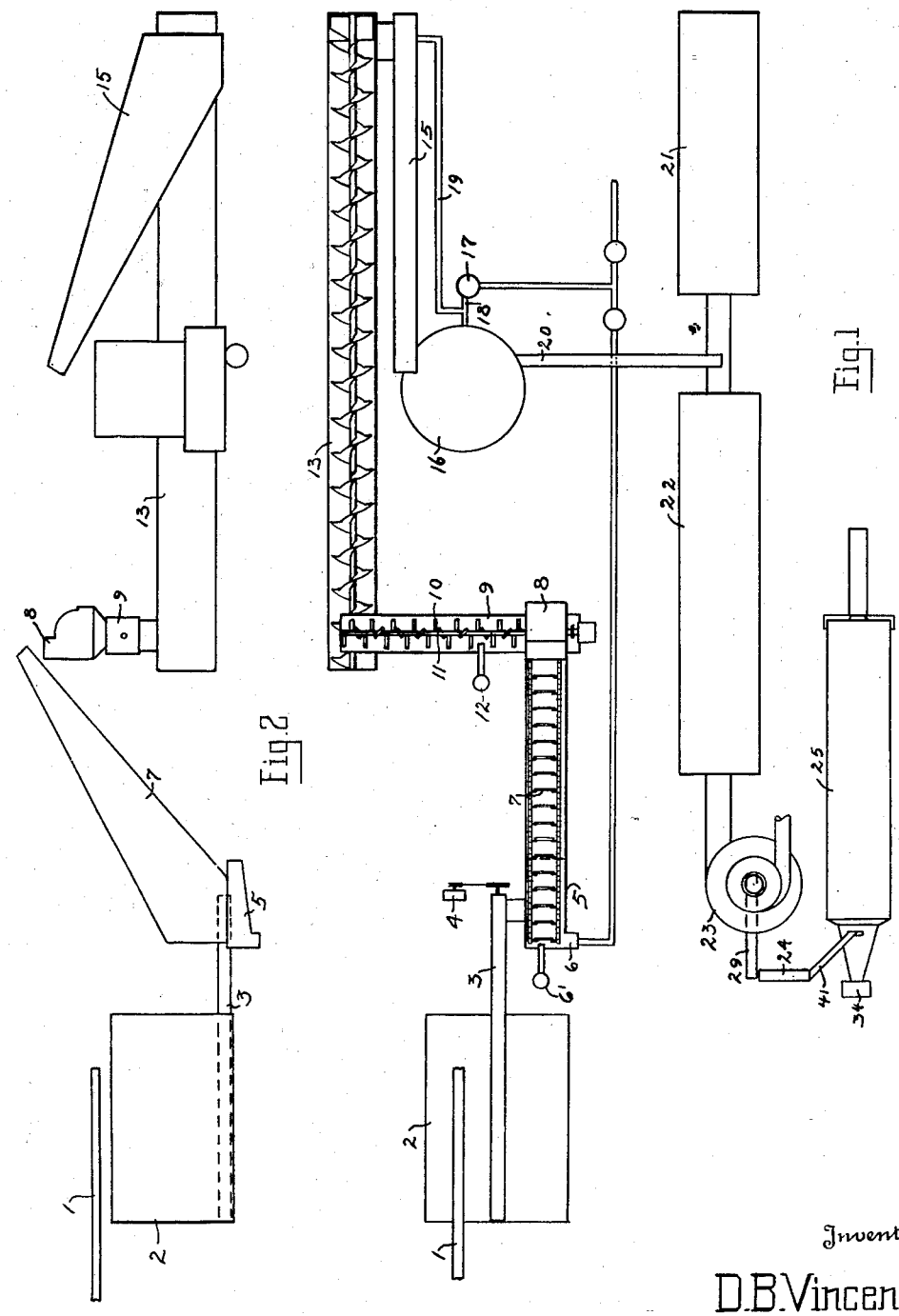
Inventor
D.B.Vincent
By Arthur Minnick
            Attorney

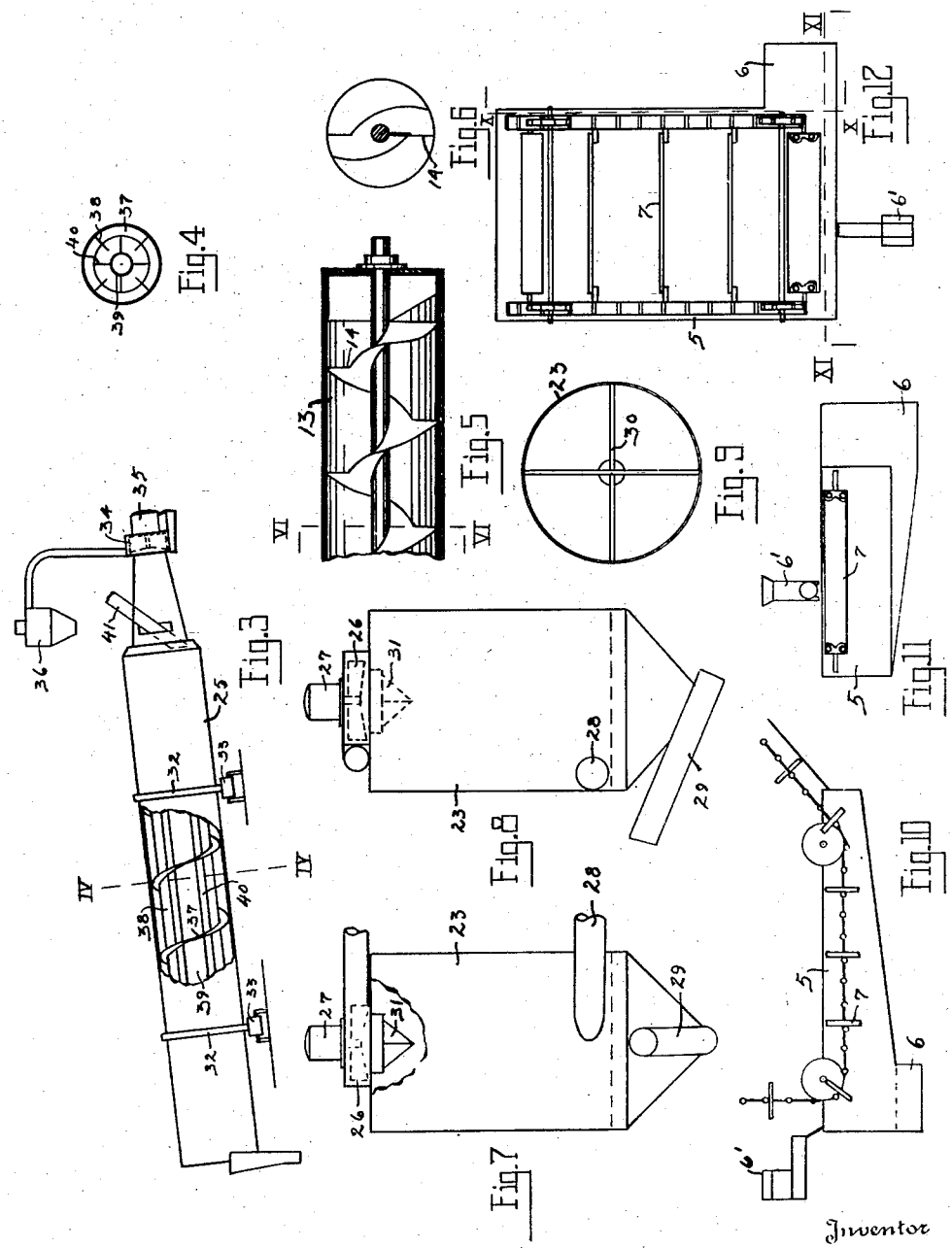

UNITED STATES PATENT OFFICE 2,471,363

PROCESS OF MAKING FOOD PRODUCTS

Daniel Boscawen Vincent, Tampa, Fla., assignor to Dan B. Vincent, Inc., Tampa, Fla., a corporation of Florida Application November 27, 1945, Serial No. 631,072

15 Claims. (Cl. 99—2)

The primary object of the present invention is to provide a simple and efficient method for the progressive and uninterrupted treatment of citrus fruit waste in the preparation of an improved stock or cattle feed, and the invention aims generally to improve the method described and claimed in my prior Patent No. 2,215,944, granted September 24, 1940.

Another object is to eliminate the human elements of error and negligence in administering the chemical treatment of the citrus waste as disclosed in the above-mentioned patent.

A further object of the invention is to provide a series of devices for the controlled performance of successive steps of the above-mentioned process to insure the correct chemical and physical treatment of the material for the desired periods of time to yield as a uniform product, a spongy, shredded feed of light weight, great bulk, bright color, and high water absorbency, with a minimum of hard pieces, fine particles, and dust.

The Patent No. 2,215,944 discloses a method of treating citrus canner's waste, including peel, rag, and seed, with a considerable quantity of water containing lime and/or other alkaline materials, to neutralize and free citric acid and to react on the bitter glucosides and other substances causing objectionable taste or odor, yielding a solution or suspension which can be drained away from the spongy, pressable pulp, from which a high percentage of the water can be removed by a press to leave a moist bulky mass readily dried by air. According to said patent the citrus waste was first ground or shredded and suspended in sufficient water to form a slimy fluid mass and the alkaline material was added thereto in sufficient amounts to form the transient gel as the slimy fluid mass and alkaline reagent were mixed in the mixing conveyor. Thus the full strength of the alkaline material could react upon the exposed pectins of the ground or shredded waste and substantial amounts of water-insoluble pectins were converted into insoluble compounds of calcium and pectins which, when once dehydrated, would not reabsorb water.

Since lime is the preferred alkaline compound used in the present system, the operations will here be described as performed with lime, but it is to be understood that other suitable alkaline compounds and mixtures are to be included in the full range of equivalents as set forth in Patent No. 2,215,944.

When lime is added to citrus waste, three reactions take place: first and most quickly, the formation of calcium citrate by reaction between the lime and the free acid in the water or juices; second, the formation of a gel by reaction between the lime and the glucosides in the peel; and third, and more slowly, the formation of calcium pectate by reaction between the lime and the pectin in the solids.

The first reaction is desirable as preventing corrosive action of the citric acid on the metals of the machinery and as eliminating a substance subject to deterioration and not desired in the finished product.

The second reaction is also desirable in removing the bitter flavors and the gels which would otherwise interfere with pressing and drying.

The third reaction is undesirable because calcium pectate is a hard, brittle substance when dry, that crumbles to a powder and has little water-absorbing properties. I have found that the formation of this water-insoluble compound of calcium and pectins takes place as the result of an excessively alkaline reaction of the lime with the pectins of the ground peel. Apparently it also takes place as the result of action of the enzymes in the waste material on the pectins where a substantial ageing period is permitted between the chemical treatment and subsequent pressing operation. The production of calcium pectate should be held to a minimum, yet in some previous treatments, the brittle pieces and the fine dusty particles of calcium pectate sometimes constitute 20% to 30% of the product, which must be screened out as inferior material.

In one previous treatment of the citrus waste, the peel from the cannery was dumped on a concrete platform, then fed by hand-operated shovels to an elevator leading to a hammer mill where the peel was ground and crushed and passed on to a pug mill. In the hammer mill, a slurry of lime water was added, the attempt being made to control the quantity for proper action. However, control is hard to maintain at that point because the waste varies so greatly in acidity and in glucoside content, that the proper amount of lime needed cannot be accurately determined until the color change and the formation of the transient gel has taken place in the pug mill after the waste has passed the place where the lime is added. Over-neutralized and under-neutralized portions become mixed in the pug mill in an approach to proper operative conditions, but some parts are permanently damaged.

In another method, the waste is ground and lime is added to the ground waste in a screw conveyor by which the material is carried to a storage bin. Some mixing occurs in the conveyor but actually, over-limed and under-limed batches reach the storage bin where they lie intermingled. Seepage of liquid from both sorts causes a certain balance in which the lime content may be too much or too little according to the nature of the waste, which is variable. The solids pack in the bin, from which they must be dug out by hand tools, this being a hard and costly job, with great variation in the length of time spent in the bin by different portions of the material. In commercial practice such storage bin methods have produced substantial amounts of calcium pectate in the peel, which I believe may be the result of long reaction of the calcium with the insoluble pectins.

It will be seen that such methods produce large quantities of the brittle calcium pectate because the mixing of the lime with the ground waste is not uniform and because there is no control of the period of reaction in the different concentrations.

The procedure herein described attempts to overcome the defects of the previous methods. Lime is added to the waste, in the form of an aqueous solution before it is shredded, in sufficient quantity to neutralize the free acid in the water and it is present during the shredding operation to neutralize the acid quickly after it is released from the peel. Thus, protection of the machinery begins at the start of the treatment.

Disintegration of the waste is preferably a shredding operation, rather than grinding or crushing. The long shreds with cut surfaces permit better contact with the liquid during the chemical treatment and present a more open mass to the gases during the drying stages, to yield a final product of more desirable texture.

In the event that all of the lime in the water is used up, during the shredding operation, as the acids in the peel continue to be liberated, without achieving the desired alkalinity for gel formation, an additional amount of lime may be added to the shredded waste in the mixing trough and rapidly mixed therewith to the extent necessary to form a desired transient gel, such as that described in my above mentioned patent. When such additional lime is required, it may be added in a smaller amount and thus may be more accurately controlled to agree with the exact requirements of the material at the gel stage in the mixing trough. The rapid mixing of the lime with the free acids and glucosides in the water, allows quick neutralization of acids, glucosides, and lime, leaving insufficient lime in the water in the delay conveyor to react very strongly on the pectins remaining in the solid portions of the waste.

The breaking of the gel by the slow reacidation caused by solution of the acid in the peel is provided for by a slow movement through the delay conveyor, after which the watery liquid of a slight acidity is strained and pressed from the spongy pulp, which then is acted upon by driers. The waste is thus in substantially continuous movement from the time it enters the primary liming tank until it is ready for the bags in which it is placed after leaving the cooler.

In the accompanying drawings, illustrating diagrammatically a preferred sequence of devices to carry out my process, Figure 1 is a plan view of the entire assembly of mechanisms used to treat the waste; Fig. 2 is a side elevation of the mechanisms shown in the upper portion of Fig. 1 for operations prior to the drying stages; Fig. 3 is a side elevation of the cooling drum; Fig. 4 is a transverse section through the drum of Fig. 3 on the line IV—IV; Fig. 5 is a fragmentary longitudinal section of one end of the delay conveyor; Fig. 6 is a transverse section through the conveyor of Fig. 5 showing a portion of the helicoid; Figs. 7 and 8 are elevations at right angles to each other of the expansion chamber for the material coming from the drier; Fig. 9 is a plan view of the lower baffle of the expansion chamber; Fig. 10 is a longitudinal, vertical section through the primary liming tank on the line X—X of Fig. 12; Fig. 11 is a transverse vertical section through the same tank on the line XI—XI of Fig. 12; and Fig. 12 is a plan view of the same tank.

In Fig. 1, an overhead conveyor 1 of any suitable type delivers cannery waste from the canning plant to the receiving bin 2 in the feed mill. The bin has a bottom sloping downward toward the screw conveyor 3 so that the waste moves by gravity to the conveyor which is driven by a variable speed drive 4 to remove the waste from the bin in a controlled and constant supply to the primary liming tank 5.

The bottom of the tank 5 slopes longitudinally downward from the rear toward the front and slopes laterally sidewise at the front into a trap for metal, shown as a settling box 6. A chain conveyor has a plurality of paddles 7 the lower ones of which move longitudinally of the tank 5 with their tops at about the level of the water in the tank, this water level being maintained preferably by a float valve control, or by hand if desired.

The rapid passage of the paddles moving through the tank causes a current of water in the direction of movement of the paddles and a reverse movement or countercurrent along the sloping bottom of the tank. The turbulence caused by the paddles and the agitation as the waste falls from the conveyor will throw out any metal or other foreign material heavier than water, as for example a nut or bolt in a half-shell of grapefruit, to sink to the sloping bottom and eventually to the trap or settling box 6.

Hydrated lime is fed in dry form into the primary limer 5 at a controlled rate by a variable speed chemical conveyor 6'. As soon as the lime falls into the water it becomes thoroughly mixed throughout the waste as the water is churned by the rush of paddles of the elevator.

The concentration of lime in the water at this point is regulated by a pH meter which controls the speed of flow of lime from the feeder 6', and this concentration is sufficient to neutralize a great part of the free acid entering with the waste juices to eliminate any corrosive action on the metal of the machinery during subsequent operations.

The waste becomes coated with the solution of lime and as the paddles carry it upward to the shredding machine 8, a quantity of the water is taken with it. The waste and water fall into the throat of the shredder and the paddles return over their track to the primary limer tank. The proportion of lime to waste leaving the limer is substantially constant but is not sufficient to cause a long continued alkaline reaction after the waste has been shredded. In the preferred form of shredder, the waste is sliced and torn into long, slender shreds, greatly increasing the surface exposed to the liquid and freeing acid and glucosides from the cells though any other suitable form of disintegrating or comminuting apparatus suitable for dividing the waste to desirable particle size is contemplated as a shredding operation. As the waste leaves the shredder, it falls into the mixing trough 9 where the slightly limed water and the freshly cut waste is mixed vigorously and thoroughly by the inclined mixing blades 10, on the shaft 11 which also act to thrust the material along the trough. In about sixty seconds, the mixture will progress about halfway along the trough and the lime from the primary limer will normally have been entirely combined with the free acids and some of the glucosides until the mass has become definitely acidic.

At this point, the additional amount of lime necessary to cause the brownish transient gel described in the above-mentioned patent may be added to the mass by another variable chemical feeder 12, and this additional lime is immediately mixed thoroughly and quickly by the blades 10 stirring up the mass for another sixty seconds more or less while the pulp continues to move on through the mixing trough and into a delay conveyor 13.

The thorough rapid mixing of the shredded waste in the first part of the trough 9 disposes of the lime remaining from the primary liming tank 5 and the rapid mixing in the trough after the secondary liming results in quick reduction of the alkaline concentration by the action of acids and glucosides, so that the weakly alkaline liquid entering the delay conveyor has little effect on the pectin still in the solids of the pulp.

The second lime feeder is preferably actuated by another pH meter, which in turn is set by a color controlled device and always delivers the proper amount of lime to the waste to satisfy the requirements for a perfect reaction as described by the patent. Since the glucosides of grapefruit, tangerines, and different varieties of oranges vary slightly in the color changes produced when the peel is treated with lime, and the correct pH is slightly different for each of these fruits, this dual control bridges the gap between guess work and efficiency. The primary liming being stabilized enables the secondary control to detect differences in acidity and glucosides in materials passing before it, to measure the requirements for the specific waste, and to add the correct amount of lime at the correct place.

If the secondary liming operation is omitted, as in case of temporary shut down of the feeder 12, the feeder 6 can be operated either by automatic or manual control to deliver a greater quantity of lime sufficient for the entire operation in the mixing trough 9, but in this case, the operator must watch the color changes more closely and may have to add water containing weak acid from some operation in the cannery or from the press to correct any temporary excess of alkalinity.

The delay conveyor 13 is a long tank containing a low pitch helicoid of special design as shown in Figs. 5 and 6, the purpose of which is to move the treated waste slowly (usually about ten minutes from entry to exit) and allow reacidulation of the liquid to break the gel to leave a watery liquor which can be drained and pressed from the pressable solids as described in the Patent No. 2,215,944, without excessive breakage or damage to the tender fragments.

After passing through the delay conveyor, the pressable mass falls into the elevator 15. This elevator contains a perforated screen bottom allowing some of the liquid to drain off as the mass is being elevated and dumped into the top of a suitable press 16. In this press, a considerable portion of the watery liquids, usually from 60% to 75% by weight, is pressed out and separated from the solids and pumped away by the pump 17 for further reconversion or for use in the primary limer or elsewhere. A pipe 18 extends from the press 16 to the pump 17 and a pipe 19 connects the elevator 15 with the pipe 18, so that the same pump serves the press and the elevator.

The pressed solids are delivered to the drying system by a conveyor 20. This system consists of a furnace 21, a drying drum 22, an expansion chamber 23, an elevator 24 and a cooling drum 25.

The burners of the furnace are controlled by a compressed air device which automatically raises or lowers the fuel supply to the burners according to the temperature of the drying gases passing out of the dryer. If the feed is too damp, the drying gases will fall in temperature and automatically cause a thermostatically controlled diaphragm to admit more fuel to the burners and hence more heat to the dryer. If the feed is drying too fast, the drying gases will rise in temperature and automatically reduce the heat in the dryer. This automatic control insures a uniformly finished feed at all times without manual control. The expansion chamber 23 separates the feed out of the drying gases by a centrifugal sliding action eliminating the damaging effect of fan blades and abrupt obstructions. The fan 26 driven by the motor 27 is mounted at the top of the cylindrical expansion chamber to cause a partial vacuum, drawing the hot gases and the partially dried hot feed through and from the dryer 22 through the pipe 28 which enters tangentially of the inner periphery of the chamber so that the solids slide around the smooth interior until the weight becomes too great to be sustained by the air pressure. In the continuous downward movement through the conical bottom 29 to the conveyor 24, the solids clog the outlet to prevent intake of air at that point. The cyclonic effect of the swirl of air is so great in the center that solids might be lifted upward if this movement were permitted in the conical bottom. The baffle 30 of flat crossed plates just beneath the intake pipe 28 effectively prevents this air whirl from extending below the baffle.

It is desirable that the gases above the baffle shall travel at great velocity around the chamber, as this action, by centrifugal force, throws all particles of the solids against and around the walls and holds them there spinning around in an elevated position. When this mass of suspended circulating feed becomes greater than the pressure of the air can sustain, the excess portion slips down the wall below the baffle 30. In continuous operation, the size of the supported circular mass remains substantially constant and there is a continuous slipping portion moving downward all around the wall into the bottom 29.

At the top of the cylindrical chamber, an axial baffle 31 of triangular flat plates breaks the cyclonic movement of the air rushing into the opening below the fan and prevents the escape of light particles that might otherwise escape through the fan.

In the central portion of the chamber, the solids lose their heated gases into the partial vacuum and some of the water is removed as these gases escape.

In the cooling drum 25, the cylindrical shell is carried by metal bands 32 riding on rollers 33 which are motor driven to cause rotation of the shell. A fan 34 driven by a motor 35 draws a current of air in at the open lower end of the shell and out at the upper end to a cyclonic separator 36 where the dust is caught and the air escapes.

Around the inner periphery of the shell is a band 37 extending inwardly several inches and running in a spiral from one end of the drum to the other. Between the turns of this spiral are a number of flat plates 38. These plates are set longitudinally and are fastened along their outer edges to the inner periphery of the drum and extend radially inward somewhat beyond the width of the spiral band. Around the axis of the drum is a cylinder 39 supported by radially disposed longitudinal plates 40. One edge of each of these plates is secured to the inner cylinder 39 and the outer edge to the spiral band 37 at the points where they meet. The plates 38 and 40 extend the whole length of the drum except about two feet at the intake end. A chute 41 delivers hot solids carried from the expansion chamber 23 by the discharge pipe 29' and elevator 24, into the upper end of the drum.

In operation, the drum is set at a slight pitch and is rotated slowly at about ten revolutions per minute. The hot feed entering the revolving drum through the chute 41 falls to the bottom of the shell where it slides downward under the action of gravity and the conveying action of the spiral 37 until it is engaged by one of the plates 38. This plate acts as a shelf to lift the feed as the drum rotates and as the shelf approaches a vertical position, the feed slides off into the space between two plates 40 upon the upper surface of the cylinder 39. With continued rotation, the feed slides off the blade 40 ahead of it and drops into the bottom of the shell.

When the next plate 38 reaches the fallen mass, the operation is repeated. During all this progressive movement of the feed through the drum, a current of air is drawn through the drum by the fan over the material as it lies spread out and as it tumbles from one shelf to another. Practically the entire movement of the feed is that of slipping and sliding along in spread out sheets which are separated and reformed at each tumbling drop from one plate to the next surface. This enables the current of air at subatmospheric pressure to carry off any escaping moisture from the hot feed to continue the drying operation by evaporation of water and to cool the feed quickly by the refrigerating effect of the evaporation. Normal atmospheric air can be used as the drying medium even on very humid days because the entering air encounters material of a warmer than atmospheric temperatures and it becomes progressively warmer as it encounters still warmer feed. The capacity of air for carrying moisture is approximately doubled with every 20° rise in temperature. Assuming an outside temperature of 72°, feed entering the cooling drum at 140°, and the air entering at 72° and leaving at 132°, it will be seen that the rise of 60° in the temperature of the air has almost doubled its water carrying capacity three times giving a final capacity of about seven times the original capacity. Competent authorities state that one pound of air at 72° will carry .016691 pound of water while one pound of air at 132° will carry .118548 pound of water. The cooling and drying operations are accomplished simultaneously.

The pulp has undergone five water-removing steps after leaving the delay conveyor. The screen in the elevator 15 allows the most of the free liquid to flow away as the pulp moves to the press. The press takes out 60% to 75% of the water by mechanical pressure. In the drying drum 22, the heated pulp gives up water to the hot gases from the furnace 21. In the expansion chamber, the subatmospheric pressure maintained by the fan causes expansion of the pulp and a further loss of water as the shreds swirl about in the hot gases losing some heat as the water evaporates.

In the cooling drum 25, the gradual heating of the cool air by contact with the hot pulp so greatly increases the capacity for water carrying that the finished product is well within the permissible limit of 10% such pulp may retain without undue deterioration.

As an example of the practicability and efficiency of the invention, in one commercial plant operation controlled by one operator and one assistant, the receiving bin is 25 feet long by 15 feet high and holds 150,000 pounds of waste from a canning plant that must dispose of 25,000 to 30,000 pounds of waste each operating hour. The primary limer is 4 feet wide by 2 feet deep; the mixing trough is 20 inches wide by 12 feet long; the delay conveyor 36 inches wide by 30 feet long; the drying drum 8 feet in diameter by 24 feet long; the expansion chamber 6 feet in diameter by 12 feet in height; the cooling reel 4 feet in diameter by 18 feet long. The entire machinery set-up is arranged in a space only 40 feet wide by 65 feet long and processes the entire output of the canning plant into 2800 to 3000 pounds of finished feed per hour.

It will be understood that the details shown are illustrative and not restrictive, and that the right is expressly reserved to make such changes and variations as may come fairly within the scope of the claims.

I claim:

1. The method of producing a bulky, highly absorptive food product from citrus cannery waste material which comprises completely coating the individual pieces of untreated citrus cannery waste with a weak aqueous solution of a non-toxic alkaline compound of sufficient concentration to neutralize the free acids of the citrus juices associated with the waste but of insufficient concentration and duration of time to materially react upon the pectins in the waste, quickly shredding the coated waste material, immediately thereafter rapidly mixing the shredded waste material in the presence of a sufficient aqueous non-toxic alkaline solution to neutralize newly released acids and form a gel, continuously and uniformly moving the gelled mass for a predetermined time to permit breaking the gel into a watery mother liquor and pulpy solids to a point where the mother liquor drains freely therefrom and thereafter drying the partially expressed solids.

2. The method of producing a food product from citrus cannery waste as defined in claim 1 in which the waste is briefly immersed in the aqueous alkaline solution so as to coat the inner and outer surfaces of the waste with the solution.

3. A method as set forth in claim 1 in which the non-toxic alkaline compound utilized in the mixing step consists of solution carried over with the citrus waste material from the first treatment step.

4. A method as set forth in claim 1 in which the non-toxic alkaline compound utilized in the mixing step includes additional alkaline material added in controlled amounts in the mixing step.

5. A method as set forth in claim 1 in which the non-toxic alkaline compound comprises calcium hydroxide.

6. The method of producing a food product as defined in claim 1 in which the predetermined timed movement of the gelled mass is uniform for successive batches of shredded material irrespective of varying amounts of shredded citrus waste delivered from the previous mixing operation.

7. The method as defined in claim 1 in which the non-toxic alkaline compound is lime water and the predetermined timed movement of the gelled mass is separate from the mixing operation and is uniform irrespective of varying amounts of material delivered from said mixing operation.

8. The method of producing a food product as defined in claim 1 in which the drying is effected with hot gases of combustion by passing the waste and hot gases of combustion through a confined drying path under subatmospheric pressure.

9. The method of producing a food product as defined in claim 1 in which drying is effected with hot gases of combustion under subatmospheric pressure and the dried waste products are separated from the current of products of combustion while under subatmospheric pressure.

10. A process as set forth in claim 1 in which drying is effected with hot gases of combustion under subatmospheric pressure and the hot gases and waste are given a tangential whirling motion to effect a separation of the waste from the subatmospheric pressure gases.

11. The method as defined in claim 1 in which the alkaline solution includes a calcium compound and insufficient time elapses from the shredding of the waste and the drying thereof to permit substantial conversion of the normal water-soluble pectins of the waste into calcium pectate.

12. A process as set forth in claim 1 in which the drying is effected with hot gases of combustion by passing the waste and hot gases of combustion through a confined drying path under subatmospheric pressure and thereafter the waste is passed through a cooler to reduce the temperature thereof and remove further moisture.

13. The method of producing a food product as defined in claim 1 in which the strength of the aqueous alkaline solution present with the waste during the shredding operation is such as to merely neutralize the additional liberated acids of the shredded waste and maintain the shredded mass in a silghtly acidic balance to prevent substantial reaction with the pectins of the waste and formation of calcium pectate therein.

14. The method of producing a food product as defined in claim 1 in which aqueous alkaline solution is lime water and the proportion of lime water to waste leaving the initial immersion operation is substantially constant and insufficient to cause a long alkaline reaction in the waste after shredding.

15. The method of producing a food product from citrus cannery waste material as defined in claim 1 in which the untreated cannery waste is initially immersed in a lime water bath, the concentration of which is controlled by adding variable amounts of lime to the bath in response to requirements for maintaining a predetermined pH value in the resulting mixture of lime water and waste.

DANIEL BOSCAWEN VINCENT.

REFERENCES CITED

The following references are of record in the file of this patent:

UNITED STATES PATENTS

| Number | Name | Date |
|---|---|---|
| 745,074 | Roche | Nov. 24, 1903 |
| 1,501,775 | Hiller | July 15, 1924 |
| 1,977,644 | Paxton | Oct. 23, 1934 |
| 1,991,242 | Cole et al. | Feb. 12, 1935 |
| 2,187,501 | Lissauer | Jan. 16, 1940 |
| 2,215,944 | Vincent | Sept. 24, 1940 |
| 2,261,224 | Christensen | Nov. 4, 1941 |
| 2,386,052 | Lundy | Oct. 2, 1945 |

FOREIGN PATENTS

| Number | Country | Date |
|---|---|---|
| 5,658 | Netherlands | Jan. 11, 1921 |